UNITED STATES PATENT OFFICE.

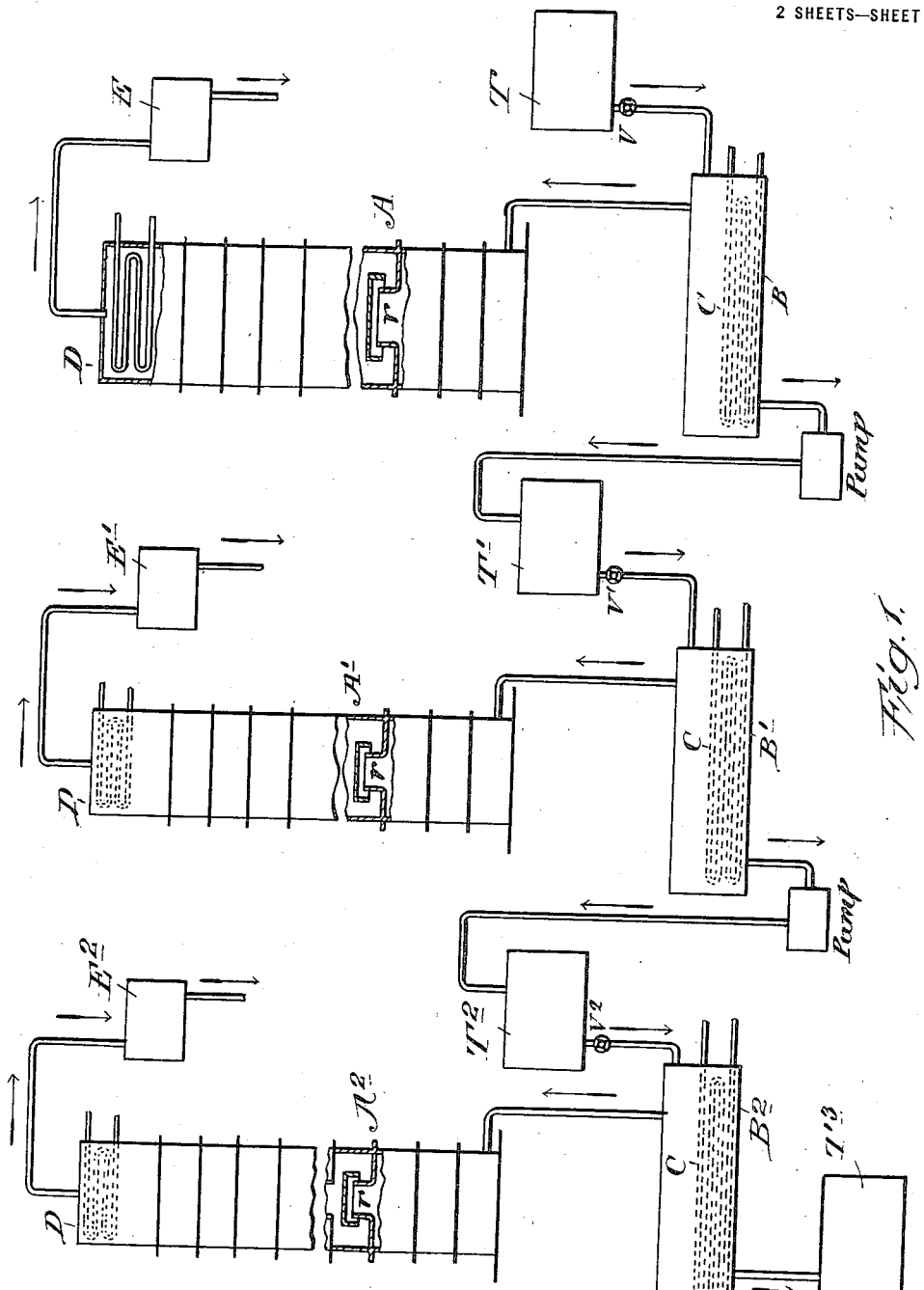

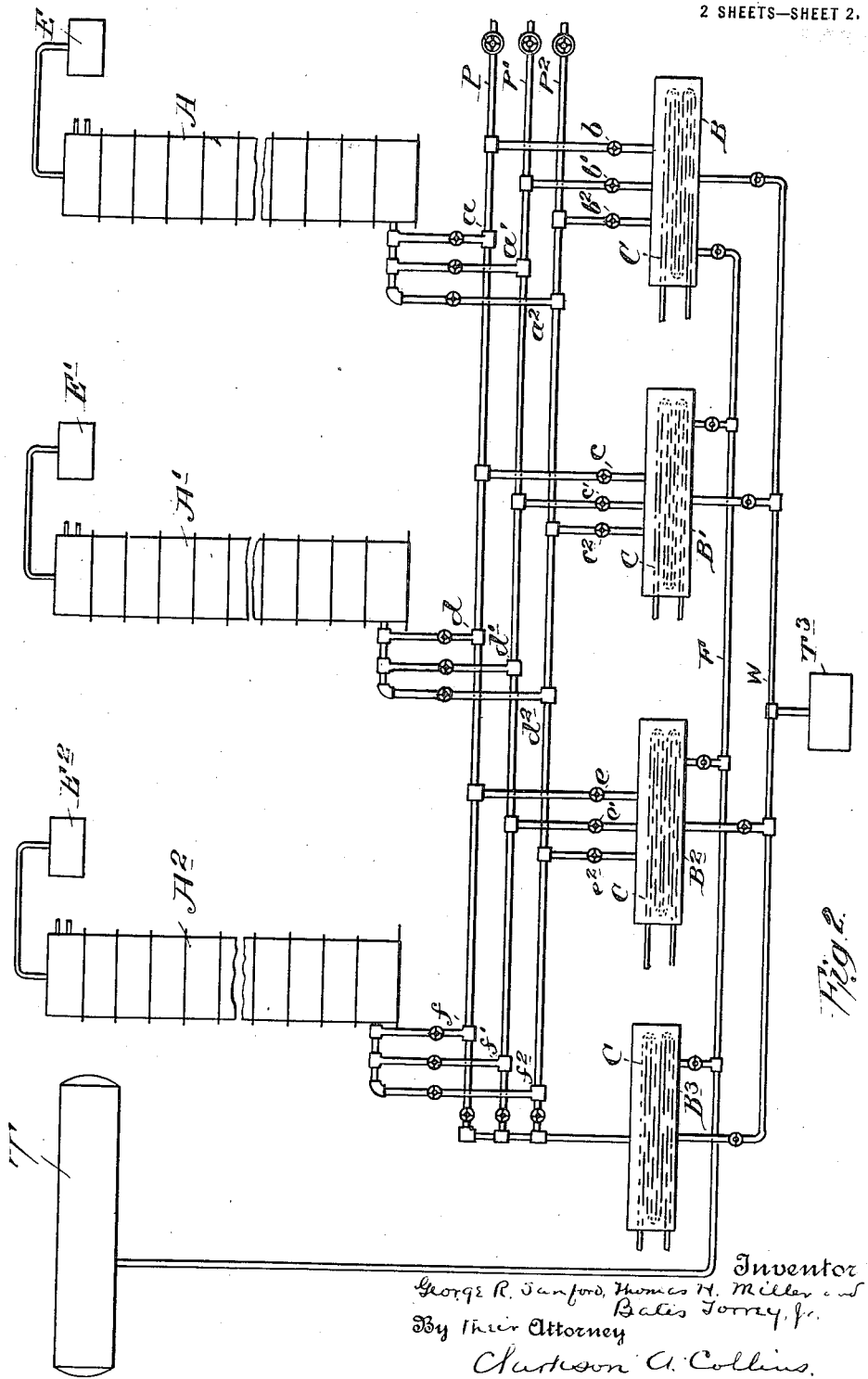

GEORGE R. SANFORD, THOMAS H. MILLER, AND BATES TORREY, JR., OF SYRACUSE, NEW YORK, ASSIGNORS TO SEMET-SOLVAY COMPANY, OF SOLVAY, NEW YORK, A CORPORATION OF NEW YORK.

ART OF SEPARATING LIQUIDS HAVING DIFFERENT BOILING-POINTS.

1,252,725.   Specification of Letters Patent.   Patented Jan. 8, 1918.

Application filed March 29, 1916. Serial No. 87,428.

*To all whom it may concern:*

Be it known that we, GEORGE R. SANFORD, THOMAS H. MILLER, and BATES TORREY, Jr., citizens of the United States, residing at Syracuse, in the county of Onondaga and State of New York, have invented certain new and useful Improvements in the Art of Separating Liquids Having Different Boiling-Points, of which the following is a specification.

While our invention may be applied generally to the separation of mixed liquids having different boiling points, it is more specifically intended to be employed in connection with the recovery in a pure state of those oils, known as light oils, which are separated, as by-products, from the gas given off in the destructive distillation of coal. These oils the principal of which are benzol, having a boiling point of 80.5° C., toluol, having a boiling point of 110.3° C., and the xylols, the boiling points of which range from 138° C. to 142° C., are in the first instance separated from the gas mixed together and with other constituents of lesser or no value, and their usefulness and commercial value depends on their separation so that each may be recovered in a pure state, uncontaminated with other ingredients. Such separation has been effected, prior to our invention, by distilling a charge of the mixed oils and passing the oil vapors through a dephlegmating column and successively condensing and collecting the vapors beyond the column until the charge is entirely distilled. A difficulty experienced in this method of operation has been that when the charge component of lowest boiling point, as benzol, has all been distilled off from the charge in the still a portion of it still remains in the upper rings of the column and, upon the continued distillation of the charge, this becomes mixed with the first part of the following toluol thus giving a portion of mixed product which must either be re-distilled or sold in its impure state.

In distinction from this procedure our invention, broadly stated, consists in discontinuing the distillation of a charge, or disconnecting the charge from the dephlegmating column, when the component of lowest boiling point in that charge has been driven off and while condensate of the component of lowest boiling point is still present in the upper part of the column and continuing the distillation in connection with that column with a fresh charge having the same component of lowest boiling point. Thus only vapors of that component having the lowest boiling point, as benzol, pass out of the column and only pure benzol is recovered therefrom. The charge from which the benzol has been driven off is connected with a second column from which pass off only the vapors of that component, as toluol, having the next higher boiling point, the charge being disconnected from this column when all the toluol has been driven off, and so on with each fractionation. In this manner each of the components of different boiling points is recovered by itself in a pure state by a simple method of operation and without any redistillation.

The invention will be best understood by describing it in connection with the accompanying drawings, Figure 1 of which is a diagrammatic representation of the arrangement of apparatus which may be used in carrying the process into effect, and Fig. 2 is a diagrammatic representation of a modified arrangement of apparatus which may be used in practising the process with modified details of operation.

Referring to the drawings, A, A', A², represent a series of dephlegmating columns and B, B', B², a corresponding series of stills, each of which is provided with heating means, as steam coils, C, C, C. The columns, A, are formed in the usual manner of rings, or pans, $r$, $r$, and each is provided in its upper portion with means for cooling the oil vapors, as cooling coils, D, D, D.

In carrying the process into effect in the fractionation of light oils a charge of the mixed oils is run, as from a storage tank, T, into the first still, B, and is heated therein so as to vaporize the oils. The oil vapors pass up through the column, A, and are cooled by the cooling coils, D. The oils of higher boiling point are condensed and pass down from pan to pan through the column. Regarding benzol as the component of lowest boiling point, a portion of the benzol is also condensed and is caught in the pans of the column while another portion passes out of the column as vapor and is condensed in a condenser, E, and drawn off to a storage tank. The distillation of the charge is continued until all the benzol has been distilled off, which will be indicated by the absence of any benzol in the lowest pan of the column, as can be ascertained by test of its contents. At this time a portion of the benzol originally present in the charge will have passed out of the column as vapor and been condensed and the remainder will be present as condensate in the upper pans having been carried up from the lower pans in the shape of continually rising hot vapors, while the less volatile components which have been condensed in the upper part of the column will have run down to and remained in the lower pans.

When the benzol has all been distilled off from the charge and while the condensate thereof in the upper part of the column is still present the distillation of the charge is discontinued and the charge is disconnected from the column, A, as by pumping it from the still, B, into tank, T'. A fresh charge is then run into still, B, and the benzol is distilled off as before. After the initial charge a quantity of benzol approximately equal to the benzol content of the charge will, upon the distillation of each charge, pass out of the column as vapor and be recovered in the pure state, the quantity of benzol remaining in the upper pans of the column being substantially constant.

The benzol free charge which has been pumped into tank, T', is run into still, B', and the toluol which is then the component of lowest boiling point therein is distilled off through column A', and recovered in the same manner as was the benzol from column A. When the charge in the still has been freed of the toluol it is in turn pumped to tank, T², and thence run to still, B², where the xylols are distilled off and recovered in the same manner through column, A², the heavier undistilled residue, consisting of naphthalene, etc., being finally drawn off into tank, T³.

In this manner the component of lowest boiling point for the time being of each successive charge is driven off through the same separate column and is collected in a pure state. In the foregoing description, as applied to the light oils, no account has been taken of the so-called "first runnings" consisting largely of carbon disulfid and having a boiling point of 46° C. This constitutes only about 1 per cent. of the mixed light oils. It may if desired be collected in a first separate column before the benzol or it may, if desired, because of the small relative quantity present, be run off through the benzol column before the benzol and separately collected as far as possible, disregarding such slight percentage of benzol as may be carried over with it.

Instead of pumping a charge from which its component of lowest boiling point has been distilled off from the still in which it has been contained and conducting it to a separate still, we may disconnect the still itself from the column with which it has been connected and connect it with the succeeding column, as illustrated in Fig. 2. In this case each of the stills, B, B', etc. and each of the columns, A, A', etc., is connected by independent pipes with each of pipes, P, P', P², corresponding in number with the number of columns employed. When the benzol is being distilled from a fresh charge, say in the still, B, the benzol being collected through column, A, still, B, and column, A, are connected as through pipes, $a$, P, and $b$, the valves in pipes, $a$, $b$, being open and the valves in the other pipes which are connected with pipe, P, being closed. When all the benzol has been distilled off from the charge in still, B, the valves in the pipes, $a$, and $b$, are closed and still, B, is connected with the toluol column, A', as through pipes, $b'$, P', $d'$. When the toluol has been distilled off the charge is in turn connected with column, A², as through pipes, $b^2$, P², $f^2$. When the xylols have been distilled off the residue is drawn off to tank, T³, through pipe, W, and the connecting pipe. Meanwhile an empty still, as B², has received a fresh charge from tank, T, through the feed pipe, F, and has been connected with column, A, as through pipes, $e$, P, and $a$. In this construction it may be desirable to provide one or more extra stills, as B³, so that an empty still may be always ready to receive a fresh charge of the mixed light oils for connection with the first column of the series. In this manner the operation of distillation is made continuous, each charge being successively connected with that column through which its component of lowest boiling point for the time being is to be run off.

Thus a continuous distillation, with recovery of pure product from each of the several columns, is maintained.

Having thus described our invention what we claim as new and desire to secure by Letters Patent is:

1. The improvement in the art of separating mixed liquids of different boiling points which consists in distilling off the mixed liquids from a charge thereof, condensing the vapors of that component having the lowest boiling point, removing and recovering in a pure state a portion of such condensate and interposing and maintaining another portion thereof in the path of the vapors from the charge, stopping the distillation when the component of lowest boiling point has been distilled off from the charge and while said portion of the condensate thereof is still interposed in the path of the vapors and continuing the operation with a fresh charge having the same component of lowest boiling point.

2. The improvement in the art of separating mixed liquids of different boiling points which consists in distilling off the mixed liquids from a charge thereof, condensing the vapors of that component of the charge having the lowest boiling point, removing and recovering in a pure state a portion of such condensate and interposing and maintaining another portion thereof in the path of the vapors from the charge, stopping the distillation while said portion of the condensate of the component of lowest boiling point is still interposed in the path of the vapors and continuing the operation with a fresh charge having the same component of lowest boiling point.

3. The improvement in the art of separating mixed liquids having different boiling points which consists in distilling off the mixed liquids from a charge thereof and condensing the vapors in a dephlegmating column, leaving in the upper part of the column only condensate of that one of the liquids having the lowest boiling point while causing the other condensates to pass downward to the lower portion of the column, stopping the distillation when all the liquid having the lowest boiling point has been driven off from the charge and disconnecting the remainder of the charge from the column and connecting with the column a fresh charge having the same component of lowest boiling point to repeat the operation.

4. The improvement in the art of separating mixed liquids of different boiling points which consists in distilling off the mixed liquids from a charge thereof and passing the vapors through a dephlegmating column, condensing within the column all the vapors of the components of higher boiling points and a portion of the component of lowest boiling point and causing another portion of the vapors of the component of lowest boiling point to pass out of the column and condensing and collecting the same in a pure state, retaining in the upper part of the column condensate of the component of lowest boiling point until such component of lowest boiling point has all been distilled off from the charge has all been distilled off from the charge stopping the distillation of the charge when its component of lowest boiling point has all been distilled off and finally disconnecting the charge from the column and connecting therewith a fresh charge having the same component of lowest boiling point to repeat the operation.

5. The improvement in the art of separating mixed liquids having different boiling points which consists in distilling off the mixed liquids from a charge thereof and passing the resulting vapors through a dephlegmating column, maintaining in the column such temperature as to condense therein the vapors of the components of higher boiling points and a portion of the vapors of the component of lowest boiling point while permitting another portion of said last named vapors to pass out of the column, maintaining condensate of the component of lowest boiling point in the upper part of the column during the distilling operation, stopping the distillation of the charge when the component of lowest boiling point has all been distilled off and connecting with the column a fresh charge having the same component of lowest boiling point to continue the operation.

In testimony whereof we have affixed our signatures this 23rd day of March, 1916.

GEORGE R. SANFORD.
THOMAS H. MILLER.
BATES TORREY, Jr.